US011958136B2

(12) United States Patent
Noda

(10) Patent No.: US 11,958,136 B2
(45) Date of Patent: Apr. 16, 2024

(54) METAL ASSEMBLED BODY

(71) Applicant: DAICEL CORPORATION, Osaka (JP)

(72) Inventor: Akifumi Noda, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 432 days.

(21) Appl. No.: 17/598,085

(22) PCT Filed: Feb. 6, 2020

(86) PCT No.: PCT/JP2020/004581
§ 371 (c)(1),
(2) Date: Sep. 24, 2021

(87) PCT Pub. No.: WO2020/195216
PCT Pub. Date: Oct. 1, 2020

(65) Prior Publication Data
US 2022/0184747 A1 Jun. 16, 2022

(30) Foreign Application Priority Data
Mar. 25, 2019 (JP) ................................ 2019-056772

(51) Int. Cl.
B23K 31/02 (2006.01)
B21D 53/88 (2006.01)
B23K 101/12 (2006.01)

(52) U.S. Cl.
CPC .............. *B23K 31/02* (2013.01); *B21D 53/88* (2013.01); *B23K 2101/12* (2018.08)

(58) Field of Classification Search
CPC . B60R 21/274; B60R 21/272; B60R 21/2171; B60R 21/261; B23K 31/02;
(Continued)

(56) References Cited

U.S. PATENT DOCUMENTS

2003/0034641 A1* 2/2003 Zimbrich .............. B60R 21/272
280/741
2003/0151241 A1* 8/2003 Matsuda .................. C06D 5/06
280/736
(Continued)

FOREIGN PATENT DOCUMENTS

CN 1604864 A 4/2005
DE 10 2012 214 747 A1 2/2014
(Continued)

OTHER PUBLICATIONS

International Preliminary Report on Patentability and English translation of the Written Opinion of the International Searching Authority dated Oct. 7, 2021 for Application No. PCT/JP2020/004581.
(Continued)

Primary Examiner — John K Fristoe, Jr.
Assistant Examiner — Madison L Poos
(74) Attorney, Agent, or Firm — Birch, Stewart, Kolasch & Birch, LLP

(57) ABSTRACT

A metal assembled body including a first member formed by forging a metal material, the first member including a peripheral wall portion in which a metal flow is formed along an axial direction and an extending portion extending from the peripheral wall portion and having an opening, the peripheral wall portion and the extending portion being formed integrally, and a closing member welded to a welding surface on the extending portion to close the opening, before the closing member is welded, the extending portion being formed to expose an end portion of the metal flow at the welding surface, and a welding position of the closing member on the welding surface being set to make a width of a first region larger than a width of a region excluding the first region, the first region being a region divided by a welding site, where arrival of a gas is inhibited.

5 Claims, 7 Drawing Sheets

(58) Field of Classification Search
CPC .... B23K 2101/12; B65D 53/88; B21K 21/08; C06D 5/00
USPC ...................................... 220/581; 280/728.1
See application file for complete search history.

(56) References Cited

U.S. PATENT DOCUMENTS

| | | |
|---|---|---|
| 2006/0255577 A1 | 11/2006 | Nakayasu et al. |
| 2012/0047983 A1* | 3/2012 | Iizuka .................. B60R 21/261 |
| | | 72/352 |
| 2012/0139148 A1 | 6/2012 | Iizuka et al. |

FOREIGN PATENT DOCUMENTS

| | | | |
|---|---|---|---|
| JP | 2003-226219 A | 8/2003 | |
| JP | 2006-306218 A | 11/2006 | |
| JP | 5136995 B2 | 2/2013 | |
| WO | WO-2012046678 A1 * | 4/2012 | ............. B21K 23/00 |

OTHER PUBLICATIONS

International Search Report dated Apr. 21, 2020 for Application No. PCT/JP2020/004581.

English translation of the Chinese Office Action and Search Report for Chinese Application No. 202080024288.X, dated Oct. 28, 2023.

* cited by examiner

METAL ASSEMBLED BODY

TECHNICAL FIELD

The present invention relates to a metal assembled body disposed to come into contact with an accommodating space in which a predetermined pressurized gas is contained.

BACKGROUND ART

For example, in a gas generator described in Patent Document 1, a configuration is adopted in which an igniter is activated in a state where pressurized gas is contained in an accommodating space to output two types of gas, a combustion gas generated by activation of the igniter and the contained high-pressure gas. As the contained high-pressure gas flows out over time, it may be difficult to exert an expected gas output upon activation of the igniter. Therefore, when a pressurized gas is contained in the accommodating space defined by a metal-working molded article, the sealed state of the pressurized gas needs to be given great care to improve the quality of a product.

The metal-working molded article containing the pressurized gas generally begins with a bulk of base material molding, and is completed to a final molded article after several forging steps. As the shape changes in the forging steps at this time, the state of a micro-structure constituting the metal also changes. In the forging steps, a relatively large force is applied to deform the base material, and thus the connection between the metal micro-structures also changes as the steps progress, leading to changes and deformation of metal flow. For example, Patent Document 2 suggests that, depending on the orientation of the metal flow of the metal-working molded article used as part of an accommodating member of the pressurized gas, there is, although very slightly, an outflow of gas along the metal flow, and hence it is important to adjust the orientation of the metal flow such that the region containing the pressurized gas and the outside are not connected.

CITATION LIST

Patent Documents

Patent Document 1: JP 2003-226219 A
Patent Document 2: JP 5136995 B2

SUMMARY OF INVENTION

Technical Problem

When an opening of the metal-working molded article formed through the forging steps is closed to define the accommodating space of the pressurized gas, additional processing such as, for example, cutting may be performed on the region near the opening. For example, in a case where a closing member is attached to the metal-working molded article by welding to close the opening, additional processing of scraping the surface of the metal-working molded article to remove a coating film or the like is generally performed to ensure the welding strength. This is because if a coating film is present on the surface of the site where welding is to be performed, suitable welding may be inhibited.

On the other hand, when an additional processing is performed on the metal-working molded article formed through the forging steps, a metal flow formed inside the molded article may be interrupted, and an end portion thereof may be exposed to the space where the pressurized gas is contained, a space where the pressurized gas may reach, and the like, and hence the pressurized gas may flow out, although very slightly, from the exposed area through the metal flow. Of course, it is possible to confirm that the amount of pressurized gas that flows out is very small, and that the sealing state of the pressurized gas is suitably maintained even if there is an outflow of pressurized gas by known techniques. Therefore, by known techniques, it is possible to prevent significant problems from occurring in the performance of products that utilize the pressurized gas (e.g., gas generator described above, etc.). However, the step of confirming the sealing state of the pressurized gas requires labor, and it is preferable that the outflow of pressurized gas basically does not occur in view of product quality. Therefore, there is still room for improvement in the related art.

In light of the problems described above, an object of the present application is to provide a technique for suppressing the outflow of pressurized gas as much as possible and maintaining a suitable sealing state.

Solution to Problem

To solve the problems described above, in an embodiment disclosed in the present specification, when a closing member is welded to a welding surface on a member formed by forging a predetermined metal material, a welding position in the welding surface is set to have a width of a first region, where arrival of a pressurized gas is inhibited in the welding surface, being larger than a width of a region other than the first region. The sealing of the pressurized gas, in which the influence of the end portion of the metal flow being exposed to the welding surface is suppressed as much as possible, can be realized by setting the welding position in this way based on the ease of arrival of the pressurized gas.

Specifically, the present embodiment relates to a metal assembled body disposed to come into contact with an accommodating space in which a predetermined pressurized gas is contained, the metal assembled body including a first member being a member formed by forging a predetermined metal material, the first member including a peripheral wall portion having a tubular shape in which a metal flow of the predetermined metal material is formed along an axial direction and an extending portion extending from the peripheral wall portion in a direction different from the axial direction of the peripheral wall portion, the extending portion having an opening that causes an inner space formed on an inner side of the peripheral wall portion and the accommodating space on an outer side to communicate with each other, the peripheral wall portion and the extending portion being formed integrally by the predetermined metal material, and a closing member welded to a welding surface having an annular shape on the extending portion to close the opening and inhibit the movement of the predetermined pressurized gas between the inner space and the accommodating space. In a state before the closing member is welded, the extending portion is formed to expose an end portion of the metal flow by the predetermined metal material at the welding surface; and a welding position of the closing member on the welding surface is set to make a width of a first region, the first region being a region divided by a welding site with the closing member on the welding surface, where arrival of the predetermined pressurized gas from the accommodating space is inhibited, larger than a width of a region excluding the first region in the welding surface.

The first member included in the metal assembled body according to the present embodiment includes the peripheral wall portion and the extending portion, and has a configuration in which the inner space formed on the inner side of the peripheral wall portion and the accommodating space in which the predetermined pressurized gas is contained are caused to communicate with each other through the opening provided in the extending portion, but the opening is closed by the closing member in the metal assembled body. That is, the metal assembled body merely needs to be disposed in a manner that brings the inner space into contact with the accommodating space in which the predetermined pressurized gas is contained, with the extending portion and the closing member provided in-between, and other arrangement modes are not limited to a specific form. Further, the inner space on the inner side of the peripheral wall portion merely needs to be a space that is shielded from the accommodating space by the extending portion and the closing member, and the shape and size of the inner space, the purpose of the inner space (what kind of component is to be disposed therein, etc.), and the like are not limited. Moreover, the predetermined pressurized gas merely needs to be a gas that is pressurized higher than the pressure in the inner space, and is not limited to a specific type of gas. For example, a known gas such as argon, helium, or the like can be used as the predetermined pressurized gas.

Here, the first member is formed by forging a predetermined metal material, and thus the peripheral wall portion and the extending portion are integrally formed. The predetermined metal material merely needs to be a metal material that can be subjected to forge processing, and is not limited to a specific material. In the first member formed by forging in such a manner, a metal flow based on the forging step is generated inside. In general, the end portion of the metal flow is not exposed to the surface of the first member when formed by the forging step, but when additional processing is performed on the first member that has been forged and formed in such a manner, for example, when processing such as scraping the surface of the first member is performed, the metal flow generated inside is interrupted and the end portion thereof is exposed. In particular, when attempting to weld the closing member to the welding surface on the extending portion to close the opening of the extending portion of the first member, a coating film (oxide film etc.) present on the welding surface is preferably removed to suitably increase the welding strength, but the end portion of the metal flow may be exposed with such a removal. The welding surface is a location where the closing member is welded and a location connected to the accommodating space directly or through a very small space, and thus if the end portion of the metal flow is exposed to the welding surface, the predetermined pressurized gas in the accommodating space reaches the end portion of the metal flow, which becomes a cause of gas outflow through the metal flow. In particular, if the metal flow is connecting the accommodating space and the outside thereof, the possibility of the gas outflow increases if the end portion of the metal flow is exposed to the accommodating space.

Therefore, in the metal assembled body according to the present embodiment, the welding position of the closing member on the welding surface is set to make a width of the first region, the first region being divided by the welding site with the closing member on the welding surface, larger than a width of a region excluding the first region in the welding surface. Note that the width of the first region or the like in the present embodiment refers to the width in the radial direction of the welding surface having an annular shape. The first region is a region where the predetermined pressurized gas cannot reach the exposed end portion of the metal flow by the welding site even if the end portion of the metal flow is exposed to the welding surface. As such, the exposed end portion of the metal flow can be avoided from attracting the gas outflow. When the welding position on the welding surface is set to make the width of the first region relatively large as described above, the predetermined pressurized gas can be suitably sealed in the accommodating space while ensuring the welding strength of the closing member at the extending portion.

Here, two forms will be described below for the welding embodiment of the closing member in the metal assembled body described above. In the first welding embodiment, the extending portion may include a first surface that faces the accommodating space and where the end portion of the metal flow is exposed thereto, and a second surface that faces the inner space. In this case, the closing member may be welded to the first surface as the welding surface (i.e., the closing member is disposed on the first surface and welded to the welding surface, which is the first surface), and the closing member may be welded to the welding surface such that a welding position of the closing member on the welding surface is located on a radially outer side of the welding surface from a center of a width of the welding surface. In such an embodiment, the first surface of the extending portion facing the accommodating space becomes a welding surface where the end portion of the metal flow is exposed by predetermined additional processing and the like. However, even with such a welding surface, the width of the first region of the welding surface becomes larger than the width of the region excluding the first region by setting the welding position in the above manner, and thus it is possible to ensure the welding strength and to achieve a suitable sealing of the predetermined pressurized gas.

Further, in the second welding embodiment, the extending portion may include a first surface that faces the accommodating space and a second surface that faces the inner space and where the end portion of the metal flow is exposed thereto. In this case, the closing member may be welded to the second surface as the welding surface (i.e., the closing member is disposed on the second surface and welded to the welding surface, which is the second surface), and the closing member may be welded to the welding surface such that a welding position of the closing member on the welding surface is located on a radially inner side of the welding surface from a center of a width of the welding surface. In such a circumstance, the second surface of the extending portion facing the inner space becomes a welding surface where an end portion of the metal flow is exposed by predetermined additional processing and the like. Although the second surface is not facing the accommodating space, when the second surface is assumed as the welding surface since the accommodating space and the inner space are substantially connected through the opening, the predetermined pressurized gas may reach the second surface in the vicinity of the opening. However, even with such a welding surface, the width of the first region of the welding surface becomes larger than the width of the region excluding the first region by setting the welding position in the above manner, and thus it is possible to ensure the welding strength and to achieve a suitable sealing of the predetermined pressurized gas.

In the metal assembled body described above, the first member may further include an annular groove portion forged and formed integrally with the peripheral wall portion and the extending portion by the predetermined metal material, and thus the end portion of the metal flow by the predetermined metal material is not exposed thereto in a state before the closing member is welded, on a basal end side of the extending portion on which the extending portion and the peripheral wall portion are connected and on a side on which the welding surface is formed; and the closing member may be welded to the welding surface such that an outer peripheral end portion of the closing member is located above the annular groove portion. The contact between the outer peripheral end portion of the closing member and the first member is avoided by providing the annular groove portion on the basal end side of the extending portion in this way. In particular, depending on the manufacturing step of the closing member, burrs may be easily generated at the outer peripheral end portion thereof, but even in such a case, the contact between the burrs and the first member is avoided, and thus welding of the closing member on the welding surface can be suitably performed. In other words, processing such as burr removal on the closing member can be omitted, and assembly of the metal assembled body is facilitated.

Note that the welding of the closing member to the welding surface in the metal assembled body described above is not limited to a specific welding method. For example, laser welding using a carbon dioxide gas laser or a YAG laser, arc welding, resistance welding, or the like can be used.

Advantageous Effects of Invention

According to the embodiment disclosed in the present specification, it is possible to suppress the outflow of the pressurized gas as much as possible and to maintain a suitable sealing state.

DESCRIPTION OF EMBODIMENTS

Aspects of a metal assembled body according to an embodiment will be hereinafter described with reference to the drawings. Note that, configurations of the following embodiments are provided as examples, and the disclosure in the present application is not limited to configurations of these embodiments. In addition, each of the configurations, combinations thereof, and the like in each of the embodiments are examples, and various additions, omissions, substitutions, and other changes may be made as appropriate without departing from the spirit of the present invention. The disclosure in the present specification is not limited by the embodiments and is limited only by claims. Furthermore, each aspect disclosed in the present specification can be combined with any other feature disclosed herein.

Figure 1:
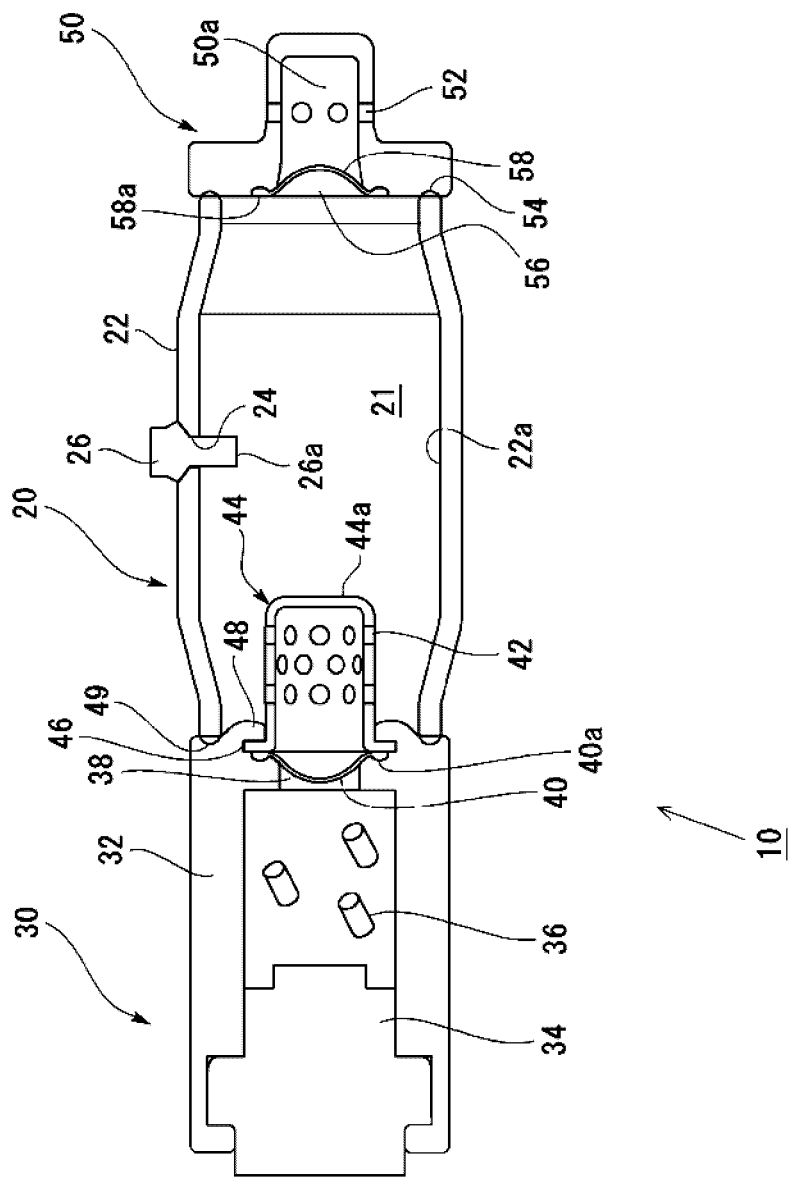
FIG. 1 is a view illustrating a schematic configuration of an inflator including a metal assembled body according to an embodiment.

FIG. 1 illustrates a schematic configuration of an inflator 10 configured to include a metal assembled body of the present embodiment. FIG. 1 is a cross-sectional view of the inflator 10 in an axial direction. Note that there are two components assumed as the metal assembled body in the present disclosure, a component in which a first rupture disc 40 is welded to a gas generator housing 32 and a component in which a second rupture disc 58 is welded to a diffuser portion 50. Each of the components will be described later, but first, the inflator 10 including each component will be described.

The inflator 10 includes a pressurized gas accommodating portion 20, a gas generator 30, and the diffuser portion 50. First, the pressurized gas accommodating portion 20 has an outer shell formed by a tubular accommodation housing 22, and has an accommodating space 21 formed inside where pressurized gas consisting of a mixture of argon and helium is filled and contained. The accommodation housing 22 is symmetrical with respect to the axial direction and a radial direction, and thus there is no need to adjust the orientation in the axial direction and the radial direction at the time of assembly.

A filling hole 24 of the pressurized gas is formed on the side surface of the accommodation housing 22, and is closed by a pin 26 after being filled with pressurized gas.

Next, the gas generator 30 includes an igniter 34 and a gas generating agent 36 accommodated in the gas generator housing 32, and is connected to one end side of the pressurized gas accommodating portion 20. The gas generator housing 32 and the accommodation housing 22 are welded at a joining portion 49. When the inflator 10 is incorporated in an airbag system, for example, the igniter 34 is connected to an external power source through a connector and a lead wire. Note that the gas generating agent 36 can use one (discharge gas temperature of 700 to 1630° C.) consisting of, for example, 34 mass % of nitroguanidine which is a fuel, 56 mass % of strontium nitrate which is an oxidizing agent, and 10 wt. % of sodium carboxymethylcellulose which is a binder. The combustion residue generated when the gas generating agent 36 having such a composition is combusted is strontium oxide (melting point 2430° C.). Thus, the combustion residue is solidified in a bulk form (slug form) without being in a molten state.

A first communication hole 38 is provided in the gas generator housing 32 at an end portion on a side opposite to the end portion where the igniter 34 is disposed. The first communication hole 38 is a hole that causes the inside and the outside of the gas generator housing 32 to communicate with each other, and functions as a hole that causes an inner space 33 (see FIG. 2) of the gas generator housing 32 and the accommodating space 21 of the pressurized gas accommodating portion 20 to communicate with each other, in a state where the gas generator housing 32 and the accommodation housing 22 are welded. In the inflator 10, the first communication hole 38 is in a state of being closed by the first rupture disc 40 that has been deformed into a bowl shape under the pressure of the pressurized gas inside the accommodating space 21, and the inside of the gas generator 30 is held at normal pressure. The first rupture disc 40 is welded to the gas generator housing 32 in the vicinity of a peripheral edge portion 40a, and the details thereof will be described later.

Here, a cap 44 having a gas ejection hole 42 is put on the first rupture disc 40 from the pressurized gas accommodating portion 20 side. This cap 44 covers the first rupture disc 40 and thus combustion gas generated by combustion of the gas generating agent 36 is always ejected from the gas ejection hole 42 through the cap 44. Note that the cap 44 has a flange portion 46 where an opening peripheral edge portion is bent outward, and is fixed by crimping a portion of the gas generator housing 32 at the flange portion 46 to form a crimped portion 48.

Further, the diffuser portion 50 having a gas discharge hole 52 for discharging pressurized gas and combustion gas is connected to the other end side of the pressurized gas accommodating portion 20, and the diffuser portion 50 and the accommodation housing 22 are welded at a joining portion 54. A filter such as a wire mesh can be disposed in the diffuser portion 50 as necessary to capture the combustion residue. A second communication hole 56 that causes the inside and the outside of the diffuser portion 50 to communicate with each other is provided in the diffuser portion 50, separate from the gas discharge hole 52. In a state where the diffuser portion 50 and the accommodation housing 22 are welded, the second communication hole 56 functions as a hole for causing an inner space 50a of the diffuser portion 50 and the accommodating space 21 of the pressurized gas accommodating portion 20 to communicate with each other. In the inflator 10, the second communication hole 56 is closed by the second rupture disc 58 deformed into a bowl shape under the pressure of the pressurized gas, and the inside of the diffuser portion 50 is held at normal pressure. The second rupture disc 58 is welded to the diffuser portion 50 in the vicinity of a peripheral edge portion 58a, and the details thereof will be described later.

An operation of the inflator 10 configured in this manner will be described. The igniter 34 is activated and ignited to combust the gas generating agent 36, thus generating high-temperature combustion gas. At this time, since the melting point of the combustion residue generated by the combustion of the gas generating agent 36 is higher than or equal to the discharge temperature of the gas generated from the gas generating agent 36, the combustion residue is less likely to melt and a solid state is held. Thereafter, the first rupture disc 40 is broken due to the rise in pressure inside the gas generator 30 by the high-temperature combustion gas, and the combustion gas including the combustion residue flows into the cap 44 and is ejected from the gas ejection hole 42. At this time, since the temperature difference between the pressurized gas in the pressurized gas accommodating portion 20 and the combustion gas is large, the combustion gas is rapidly cooled, and the high-temperature combustion residue is cooled and coagulated and the combustion residue also adheres to the inner wall surface of an end face 44a of the cap 44. Further, since the ejected combustion gas impinges on a wall surface 22a of the accommodation housing 22, the combustion residue adheres to the inner wall surface and is less likely to be discharged to the outside of the inflator 10. Thereafter, the second rupture disc 58 is broken due to the rise in pressure in the pressurized gas accommodating portion 20, and thus the pressurized gas and the combustion gas are discharged from the gas discharge hole 52 to the outside of the inflator 10 through the second communication hole 56.

<First Metal Assembled Body>

Figure 2:
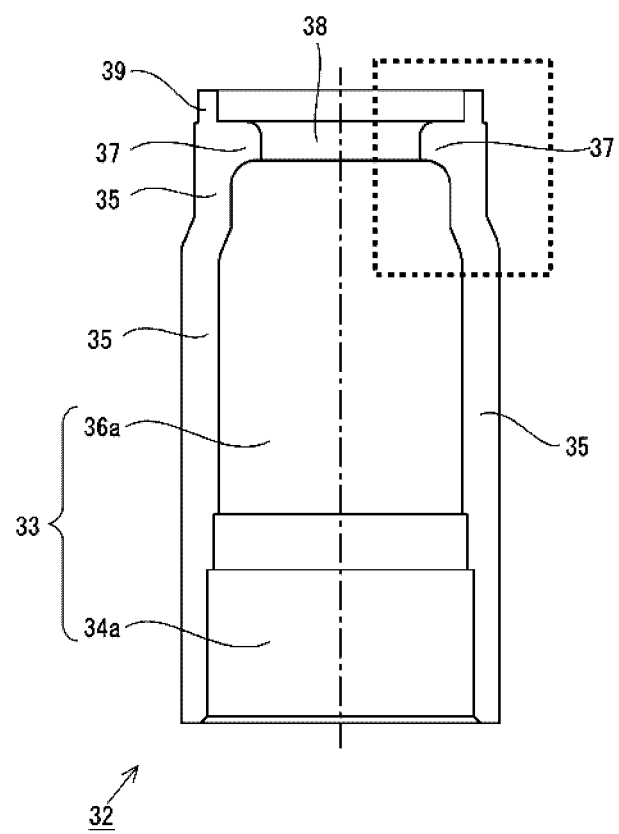
FIG. 2 is a view illustrating a configuration of a gas generator housing included in the inflator illustrated in FIG. 1 before assembling the inflator.

As described above, the inflator 10 includes two metal assembled bodies. First, a first metal assembled body including the gas generator housing 32 and the first rupture disc 40 will be described with reference to FIGS. 2 to 5. FIG. 2 is a cross-sectional view illustrating a schematic configuration of the gas generator housing 32. Note that the gas generator housing 32 illustrated in FIG. 2 is in a state before the assembly of the inflator 10, and is deformed after the inflator 10 is assembled because a part of the gas generator housing 32 is crimped.

The gas generator housing 32 has a tubular peripheral wall portion 35 that forms an outer shell thereof. The axial direction of the peripheral wall portion 35 coincides with the axial direction of the gas generator housing 32. The inner space 33 is formed on the inner side of the gas generator housing 32, and the inner space 33 is broadly divided into a space 34a in which the igniter 34 is disposed, and a space 36a in which the gas generating agent 36 is disposed. The space 36a is located closer to the first communication hole 38 of the gas generator housing 32 than the space 34a. Further, an annular protrusion 39 is formed on one end portion side of the peripheral wall portion 35, specifically, at the end portion on the side where the gas generator housing 32 joins with the accommodation housing 22. The protrusion 39 is crimped toward the inner side of the gas generator housing 32 to fix the cap 44, thus forming the portion 48 described above. Further, the first communication hole 38 is a hole defined by an extending portion 37 that is formed to extend from the peripheral wall portion 35 toward the radially inner side of the gas generator housing 32.

Here, the gas generator housing 32 is formed by a bulk of metal serving as a base material undergoing a forging step. Therefore, metal flow caused by the forging step is formed inside the gas generator housing 32. In the upper row (a) of FIG. 3, an enlarged view of a region surrounded by a dashed rectangle of the gas generator housing 32 illustrated in FIG. 2 is illustrated, where metal flow is schematically illustrated at the cross-section. The metal flow reflects the direction in which the metal, which is the base material, is deformed by the forging step. In the present embodiment, first, a forging step for forming the peripheral wall portion 35 of the gas generator housing 32 is performed, and then a forging step for forming the extending portion 37 is performed. Therefore, as illustrated in the upper row (a) of FIG. 3, it can be understood that metal flow is formed along the axial direction in the peripheral wall portion 35, and in the extending portion 37, the metal flow extends in a curved manner as if the extending portion 37 is extended from the peripheral wall portion 35.

Figure 3:
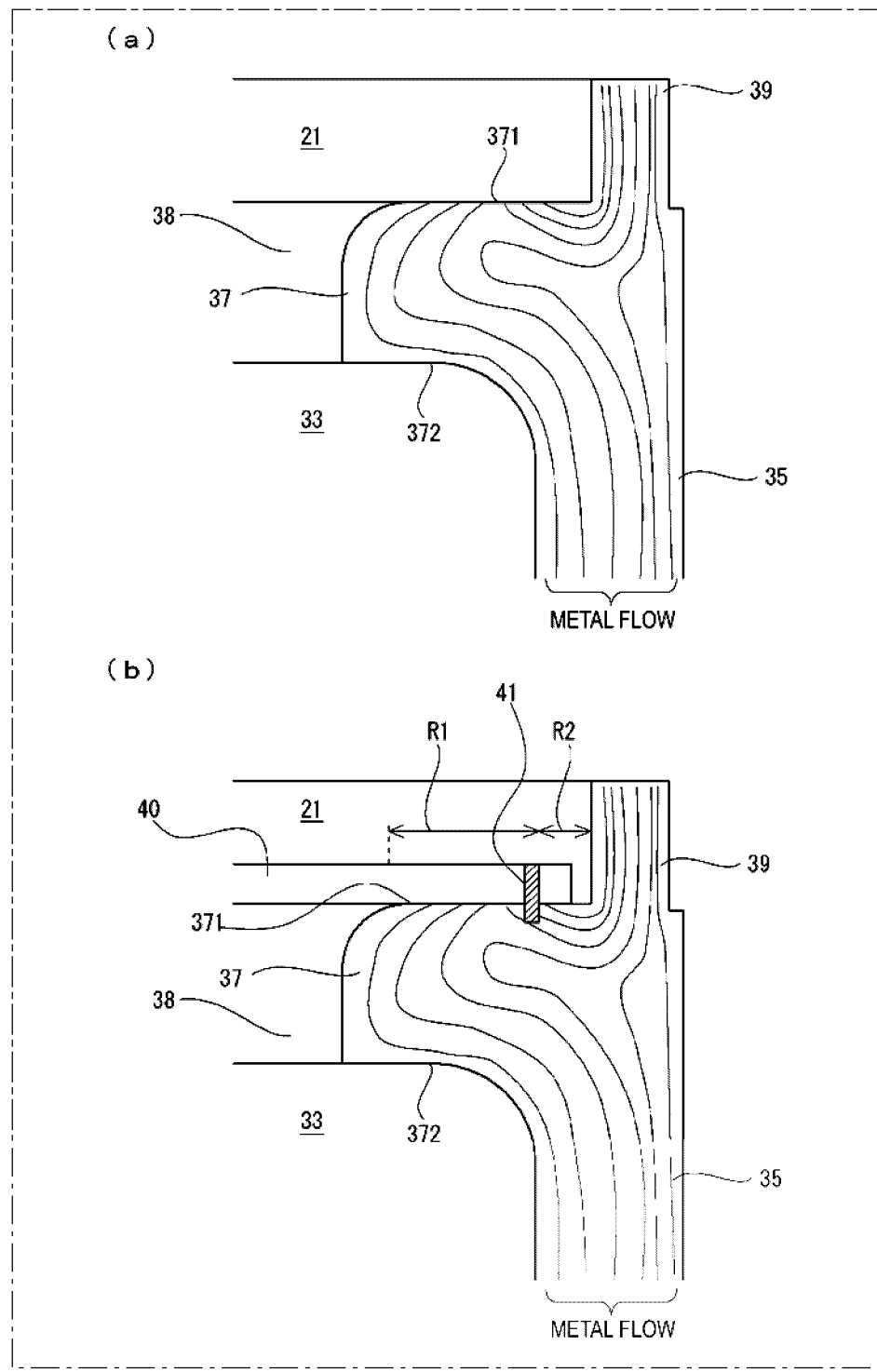
FIG. 3 is a first view illustrating a state in which a first rupture disc is welded to the gas generator housing illustrated in FIG. 2 to form a metal assembled body of the embodiment.

The first metal assembled body of the present embodiment is formed by welding the first rupture disc 40 to the gas generator housing 32 illustrated in FIG. 2. The first rupture disc 40 is a thin circular plate member and is welded to an upper end face 371, which is the end face on the side of the extending portion 37 of the gas generator housing 32, to which the cap 44 is crimped. In the welded state, the first rupture disc 40 has a size sufficient to close the first communication hole 38, as illustrated in FIG. 1. However, since the surface of the gas generator housing 32 formed through the forging step is covered with a coating film such as an oxide film, satisfactory welding may be inhibited by the coating film in such a state. Thus, before welding the first rupture disc 40, the upper end face 371 after forging and molding is subjected to surface scraping to perform the removing process for the initial coating film, thereby making the upper end face 371 the welding surface. The upper end face 371 becomes an annular welding surface. The upper end face 371 illustrated in the upper row (a) in FIG. 3 is in a state in which the removing process has been performed. Therefore, as a result of the removing process, in the upper end face 371 of the extending portion 37, the end portion of the metal flow formed inside is exposed. Note that in the present embodiment, the end face of the extending portion 37 opposite to the side to which the cap 44 is crimped is a lower end face 372. The removing process for the coating film is not performed on the lower end face 372, and thus exposure of the end portion of the metal flow is not found.

<First Welding Embodiment>

A first welding embodiment of the first rupture disc 40 in the gas generator housing 32 thus formed will be described based on the lower row (b) of FIG. 3. Since the upper end face 371 of the inflator 10 is substantially connected to the accommodating space 21, when the end portion of the metal flow is exposed to the upper end face 371 as described above, the pressurized gas contained in the accommodating space 21 enters the metal material of the gas generator housing 32 through the metal flow at a micro level, and may, although in a very small amount, flow out to the outside of the inflator 10. Thus, in the first welding embodiment, the position (welding position) of a welding site 41 between the extending portion 37 and the first rupture disc 40 in the upper end face 371 is the position illustrated in the lower row (b) of FIG. 3.

Specifically, the welding site 41 is set to be located on the radially outer side of the upper end face 371 from the center of the width of the upper end face 371, which is the welding surface, and the first rupture disc 40 is welded to the upper end face 371. As a result, when the upper end face 371, which is the welding surface, can be divided by the welding site 41 into a region R1 located on the radially inner side and a region R2 located on the radially outer side of the upper end face 371, the width of the region R1 becomes larger than the width of the region R2. Here, the region R2 is a region where the pressurized gas of the accommodating space 21 can enter between the first rupture disc 40 and the upper end face 371 at a micro level. On the other hand, further entry of the pressurized gas at a micro level is inhibited due to the welding of the first rupture disc 40 and the upper end face 371 at the welding site 41, and thus the region R1 is a region where arrival of the pressurized gas in the accommodating space 21 is inhibited. Therefore, in the embodiment illustrated in the lower row (b) of FIG. 3, the opportunity for the pressurized gas to come into contact with the upper end face 371 that has been subjected to the removing process can be suppressed as much as possible due to the relative relationship between the width of the region R1 and the width of the region R2, and thus, the outflow of the pressurized gas through the metal flow at the upper end face 371 can be suppressed and a suitable sealing state of the pressurized gas can be maintained.

Note that the welding site 41 may be determined to have the width of the region R2 as small as possible. Preferably, the welding site 41 may be determined to include the peripheral edge portion 40a on the outer side of the first rupture disc 40, in which case the width of the region R2 becomes substantially zero.

<Second Welding Embodiment>

Figure 4:
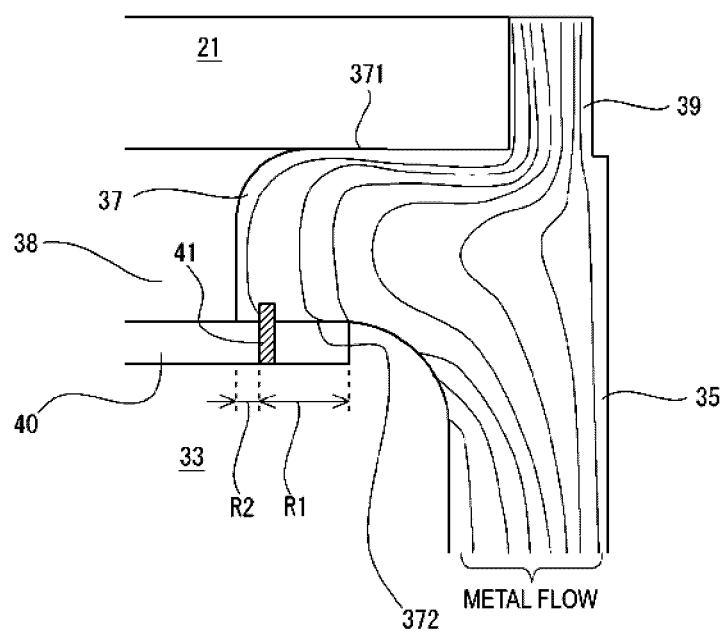
FIG. 4 is a second view illustrating a state in which the first rupture disc is welded to the gas generator housing illustrated in FIG. 2 to form the metal assembled body of the embodiment.

Next, a second welding embodiment of the first rupture disc 40 in the gas generator housing 32 will be described based on FIG. 4. Note that, in the precondition of the present welding embodiment, the welding surface of the first rupture disc 40 becomes the lower end face 372, rather than the upper end face 371. Therefore, the removing process for the coating film is not performed on the upper end face 371, and the removing process for the coating film is performed on the lower end face 372. As a result, the end portion of the metal flow is in a state of being exposed to the lower end face 372. The second welding embodiment illustrates such a welding embodiment of the first rupture disc 40 with respect to the lower end face 372. The lower end face 372 is an annular welding surface.

Specifically, the welding site 41 is set to be located on the radially inner side of the lower end face 372 from the center of the width of the lower end face 372, which is the welding surface, and the first rupture disc 40 is welded to the lower end face 372. As a result, when the lower end face 372, which is the welding surface, can be divided by the welding site 41 into a region R1 located on the radially outer side and a region R2 located on the radially inner side of the lower end face 372, the width of the region R1 becomes larger than the width of the region R2. Here, the region R2 is a region where the pressurized gas of the accommodating space 21 can enter between the first rupture disc 40 and the lower end face 372 through the first communication hole 38 at a micro level. On the other hand, further entry of the pressurized gas at a micro level is inhibited due to the welding of the first rupture disc 40 and the lower end face 372 at the welding site 41, and thus the region R1 is a region where the arrival from the accommodating space 21 is inhibited. Therefore, in the embodiment illustrated in FIG. 4, the opportunity for the pressurized gas to come into contact with the lower end face 372 that has been subjected to the removing process can be suppressed as much as possible due to the relative relationship between the width of the region R1 and the width of the region R2, and thus the outflow of the pressurized gas through the metal flow at the lower end face 372 can be suppressed and a suitable sealing state of the pressurized gas can be maintained.

Note that the welding site 41 may be determined to have the width of the region R2 as small as possible. Preferably, the welding site 41 may be determined to include a site of the first rupture disc 40 that comes into contact with the end portion of the extending portion 37 (the site adjacent to the first communication hole 38), in which case the width of the region R2 becomes substantially zero.

<Third Welding Embodiment>

Next, a third welding embodiment of the first rupture disc 40 in the gas generator housing 32 will be described based on FIG. 5. Note that in the present welding embodiment, the welding surface of the first rupture disc 40 is the upper end face 371 as in the first welding embodiment described above. However, in the third welding embodiment, an annular groove portion 373 is formed integrally with the peripheral wall portion 35 and the extending portion 37, through a forging step for forming the gas generator housing 32 at a basal end portion of the extending portion 37 (the site where the extending portion 37 and the peripheral wall portion 35 are connected). Thus, the width of the upper end face 371 narrows by the width of the groove portion 373. Note that the cross-sectional shape of the groove of the groove portion 373 is not limited to a specific shape as long as it is a shape that can be formed by the forging step. Further, the groove portion 373 is formed by the forging step but the surface thereof is not scraped, and thus the end portion of the metal flow is not exposed to the surface of the groove portion 373.

Figure 5:
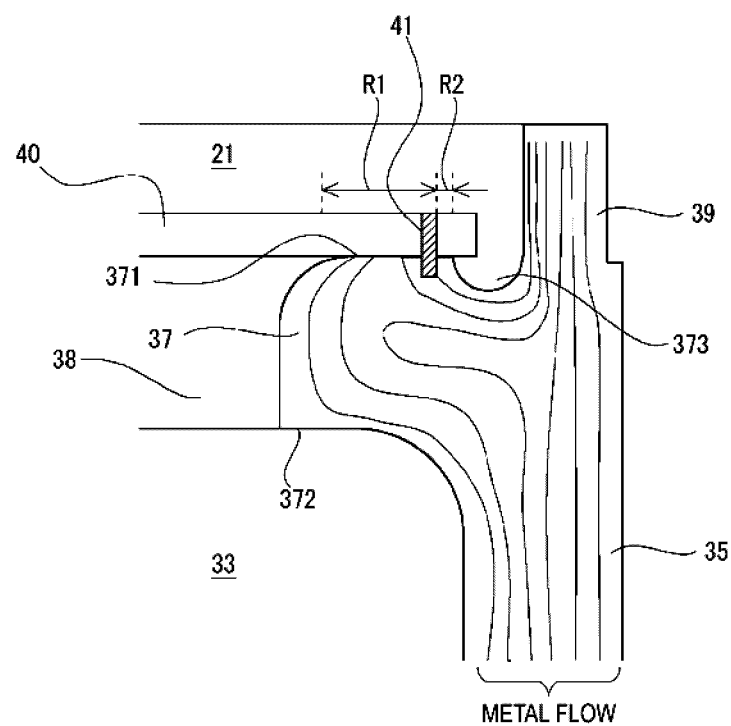
FIG. 5 is a third view illustrating a state in which the first rupture disc is welded to the gas generator housing illustrated in FIG. 2 to form the metal assembled body of the embodiment.

When the first rupture disc 40 is welded to the upper end face 371 of the extending portion 37 of the gas generator housing 32 thus formed, the peripheral edge portion 40a, which is the outer peripheral end portion of the first rupture disc 40, is positioned above the opening of the groove portion 373, as illustrated in FIG. 5. If burrs are formed on the peripheral edge portion 40a of the first rupture disc 40, the influence of the burrs on the welding can be avoided by such a positioning of the first rupture disc 40 and the extending portion 37. In other words, even if burrs are formed on the peripheral edge portion 40a, the burrs enter the groove portion 373 and hence the first rupture disc 40 can be suppressed from rising up from the upper end face 371 by the burrs. Further, due to the presence of the groove portion 373, the welding site 41 can be disposed at a certain distance relative to the protrusion 39. Thus, the device for welding can be easily disposed, and more suitable welding can be achieved.

<Second Metal Assembled Body>

Figure 6:
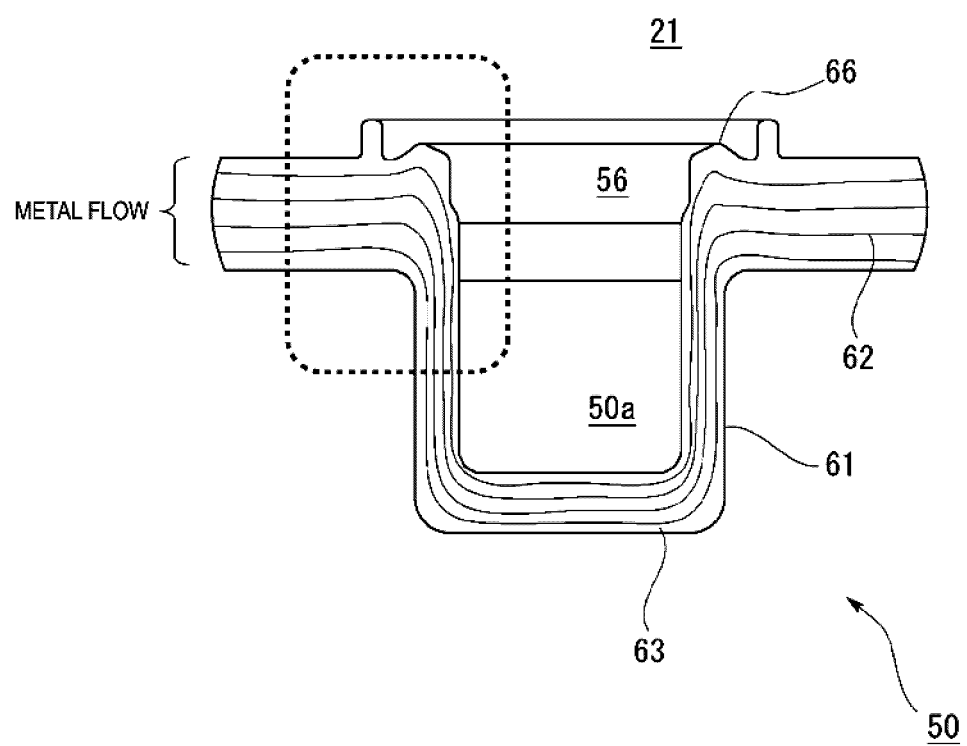
FIG. 6 is a view illustrating a configuration of a diffuser portion included in the inflator illustrated in FIG. 1 before assembling the inflator assembly.
Figure 7:
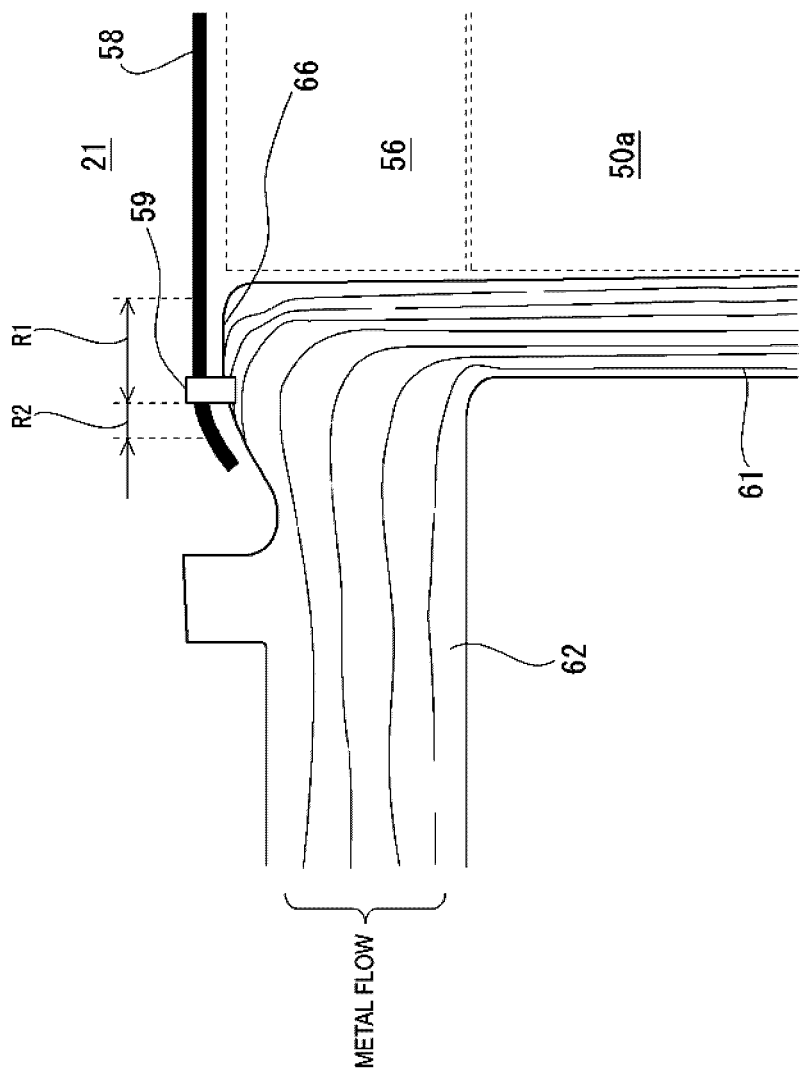
FIG. 7 is a view illustrating a state in which a second rupture disc is welded to the diffuser portion illustrated in FIG. 6 to form a metal assembled body of the embodiment.

Next, a second metal assembled body including the diffuser portion 50 and the second rupture disc 58 will be described based on FIGS. 6 to 7. FIG. 6 is a cross-sectional view illustrating a schematic configuration of the diffuser portion 50, and FIG. 7 is an enlarged view of a region surrounded by the dashed rectangle of the diffuser portion 50 illustrated in FIG. 6. The diffuser portion 50 includes a tubular peripheral wall portion 61 provided with the gas discharge hole 52 and a bottom wall portion 63 connected to the peripheral wall portion 61. The axial direction of the peripheral wall portion 61 also coincides with the axial direction of the gas generator housing 32. The inner space 50a is formed on the inner side by the peripheral wall portion 61 and the bottom wall portion 63, and the inner space 50a is connected to the outside through the second communication hole 56 and the gas discharge hole 52. In addition, the peripheral wall portion 61 is connected to an extending portion 62 at the end portion on the opposite side from the bottom wall portion 63. The extending portion 62 is formed by extending from the peripheral wall portion 61 toward the radially outer side of the diffuser portion 50. Thus, the second communication hole 56 can be referred to as an opening formed in the extending portion 62. The extending portion 62 is welded to the accommodation housing 22 to form the inflator 10, as illustrated in FIG. 1, and thus in the inflator 10, the second communication hole 56 is disposed to cause the accommodating space 21 and the inner space 50a to communicate with each other.

Here, the diffuser portion 50 is formed by a bulk of metal serving as a base material undergoing the forging step. Therefore, metal flow caused by the forging step is formed inside the diffuser portion 50. FIGS. 6 and 7 schematically describe the metal flow at the cross-section. The metal flow reflects the direction in which the metal, which is the base material, is deformed by the forging step. In the present embodiment, first, a forging step for forming the extending portion 62 is performed, and then a forging step for forming the peripheral wall portion 61 and the bottom wall portion 63 is performed. Therefore, as illustrated in FIGS. 6 and 7, it can be understood that a metal flow is formed along the axial direction in the peripheral wall portion 61, and in the extending portion 62, the metal flow extends along the extending portion 62 from the peripheral wall portion 61.

As illustrated in FIG. 7, the second metal assembled body of the present embodiment is formed by welding the second rupture disc 58 to the extending portion 62 of the diffuser portion 50. The second rupture disc 58 is a thin circular plate member and is welded to a welding surface 66, which is the end face in the vicinity of the second communication hole 56 of the extending portion 62. In the welded state, the second rupture disc 58 has a size sufficient to close the second communication hole 56, as illustrated in FIG. 1. However, since the surface of the diffuser portion 50 formed through the forging step is covered with a coating film such as an oxide film, before welding, the extending portion 62 after forging and molding is subjected to surface scraping to perform the removing process for the initial coating film, thereby forming the welding surface 66. The welding surface 66 illustrated in FIG. 7 is in a state in which the removing process has been performed. Therefore, as a result of the removing process, the end portion of the metal flow formed inside is exposed in the welding surface 66 of the extending portion 62.

Since the end face of the diffuser portion 50 where the welding surface 66 is formed in the inflator 10 is substantially connected to the accommodating space 21, when the end portion of the metal flow is exposed to the welding surface 66 as described above, the pressurized gas contained in the accommodating space 21 enters the metal material of the diffuser portion 50 through the metal flow at a micro level, and may, although in a very small amount, flow out to the outside of the inflator 10. Thus, the position (welding position) of a welding site 59 between the extending portion 62 and the second rupture disc 58 in the welding surface 66 is the position illustrated in FIG. 7.

Specifically, the welding site 59 is set to be located on the radially outer side from the center of the width of the welding surface 66, and the second rupture disc 58 is welded to the welding surface 66. As a result, when the welding surface 66 can be divided by the welding site 59 into a region R1 located on the radially inner side and a region R2 located on the radially outer side of the welding surface 66, the width of the region R1 becomes larger than the width of the region R2. Here, the region R2 is a region where the pressurized gas of the accommodating space 21 can enter between the second rupture disc 58 and the welding surface 66 at a micro level. On the other hand, further entry of the pressurized gas at a micro level is inhibited due to the welding of the second rupture disc 58 and the welding surface 66 at the welding site 59, and thus the region R1 is a region where arrival of the pressurized gas in the accommodating space 21 is inhibited. Therefore, in the embodiment illustrated in FIG. 7, the opportunity for the pressurized gas to come into contact with the welding surface 66 that has been subjected to the removing process can be suppressed as much as possible due to the relative relationship between the width of the region R1 and the width of the region R2, and thus, the outflow of the pressurized gas through the metal flow at the welding surface 66 can be suppressed and a suitable sealing state the pressurized gas can be maintained.

Note that the welding site 59 may be determined to have the width of the region R2 as small as possible. Preferably, the welding site 59 may be determined to include the peripheral edge portion on the outer side of the second rupture disc 58, in which case, the width of the region R2 becomes substantially zero.

REFERENCE SIGNS LIST

10: Inflator
20: Pressurized gas accommodating portion
21: Accommodating space
22: Accommodation housing
30: Gas generator 32: Gas generator housing
33: Inner space
35: Peripheral wall portion
37: Extending portion
371: Upper end face
372: Lower end face
373: Groove portion
38: First communication hole
40: First rupture disc
41: Welding position
50: Diffuser portion
50a: Inner space
56: Second communication hole
58: Second rupture disc
61: Peripheral wall portion
62: Extending portion
63: Bottom wall portion
66: Welding surface

The invention claimed is:

1. A metal assembled body disposed to come into contact with an accommodating space in which a predetermined pressurized gas is contained, the metal assembled body, comprising:
   a first member being a member formed by forging a predetermined metal material, the first member including,
   a peripheral wall portion having a tubular shape in which a metal flow of the predetermined metal material is formed along an axial direction, and
   an extending portion extending from the peripheral wall portion in a direction different from the axial direction of the peripheral wall portion, the extending portion having an opening that causes an inner space formed on an inner side of the peripheral wall portion and the accommodating space on an outer side to communicate with each other, the peripheral wall portion and the extending portion being formed integrally by the predetermined metal material; and
   a closing member welded to a welding surface having an annular shape on the extending portion to close the opening and inhibit movement of the predetermined pressurized gas between the inner space and the accommodating space, wherein
   in a state before the closing member is welded, the extending portion is formed to expose an end portion of the metal flow in the predetermined metal material at the welding surface; and
   a welding position of the closing member on the welding surface is set to make a width of a first region larger than a width of a region excluding the first region in the welding surface, the first region being a region divided by a welding site with the closing member on the welding surface, where arrival of the predetermined pressurized gas from the accommodating space is inhibited.

2. The metal assembled body according to claim 1, wherein
   the extending portion includes a first surface that faces the accommodating space and where the end portion of the metal flow is exposed thereto, and a second surface that faces the inner space,
   the closing member is welded to the first surface as the welding surface, and
   the closing member is welded to the welding surface such that a welding position of the closing member on the welding surface is located on a radially outer side of the welding surface from a center of a width of the welding surface.

3. The metal assembled body according to claim 1, wherein
   the extending portion includes a first surface that faces the accommodating space and a second surface that faces the inner space and where the end portion of the metal flow is exposed thereto,
   the closing member is welded to the second surface as the welding surface, and
   the closing member is welded to the welding surface such that a welding position of the closing member on the welding surface is located on a radially inner side of the welding surface from a center of a width of the welding surface.

4. The metal assembled body according to claim 2, wherein
   the first member further includes an annular groove portion, the annular groove portion being forged and formed integrally with the peripheral wall portion and the extending portion by the predetermined metal material, on a basal end side of the extending portion on which the extending portion and the peripheral wall portion are connected and on a side on which the welding surface is formed, such that the end portion of the metal flow in the predetermined metal material is not exposed to the groove portion before the closing member is welded; and
   the closing member is welded to the welding surface such that an outer peripheral end portion of the closing member is located above the annular groove portion.

5. The metal assembled body according to claim 3, wherein
   the first member further includes an annular groove portion, the annular groove portion being forged and formed integrally with the peripheral wall portion and the extending portion by the predetermined metal material, on a basal end side of the extending portion on which the extending portion and the peripheral wall portion are connected and on a side on which the welding surface is formed, such that the end portion of the metal flow in the predetermined metal material is not exposed to the groove portion before the closing member is welded; and
   the closing member is welded to the welding surface such that an outer peripheral end portion of the closing member is located above the annular groove portion.

* * * * *